US009794122B2

(12) United States Patent
Park et al.

(10) Patent No.: US 9,794,122 B2
(45) Date of Patent: Oct. 17, 2017

(54) METHOD FOR PROPAGATING NETWORK MANAGEMENT DATA FOR ENERGY-EFFICIENT IOT NETWORK MANAGEMENT AND ENERGY-EFFICIENT IOT NODE APPARATUS

(71) Applicant: EWHA UNIVERSITY-INDUSTRY COLLABORATION FOUNDATION, Seoul (KR)

(72) Inventors: Hyung gon Park, Goyang (KR); Jung min Kwon, Goyang (KR); Min hae Kwon, Seoul (KR); Soon young Kim, Seoul (KR); Min ji Lee, Seoul (KR); Ye seul Jo, Seoul (KR)

(73) Assignee: EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 247 days.

(21) Appl. No.: 14/748,334

(22) Filed: Jun. 24, 2015

(65) Prior Publication Data
US 2016/0006814 A1 Jan. 7, 2016

(30) Foreign Application Priority Data
Jun. 24, 2014 (KR) ........................ 10-2014-0077225

(51) Int. Cl.
*G06F 15/177* (2006.01)
*H04L 12/24* (2006.01)
(52) U.S. Cl.
CPC ................ *H04L 41/0833* (2013.01)

(58) Field of Classification Search
USPC ......................................... 709/222
See application file for complete search history.

(56) References Cited

U.S. PATENT DOCUMENTS

| 9,335,816 B2 * | 5/2016 | Feng ................. H04W 52/0216 |
| 9,351,246 B2 * | 5/2016 | Nieminen ............. H04W 4/005 |
| 2002/0044549 A1 * | 4/2002 | Johansson ............... H04L 45/02 370/386 |

(Continued)

FOREIGN PATENT DOCUMENTS

SE  WO 2014048450 A1 *  4/2014  ............ H04W 4/005

*Primary Examiner* — Alicia Baturay
(74) *Attorney, Agent, or Firm* — Lex IP Meister, PLLC (57) ABSTRACT

A method for propagating network management data for energy-efficient internet of things network management and an energy-efficient internet of things node apparatus are disclosed herein. The method includes dividing a plurality of sub-nodes into at least two terminal sub-nodes and the remaining intermediate sub-nodes, and determining a transmission path so that the terminal sub-nodes and the intermediate sub-nodes satisfy an acyclic graph condition, dividing the plurality of pieces of data of network management information into at least two data groups, and transmitting one of the at least two data groups to one of the terminal sub-nodes respectively, transmitting the data of the received data group to adjacent intermediate sub-nodes, performing network coding on selected two pieces of data, transmitting the network-coded data to the at least two intermediate adjacent sub-nodes, and decoding the received network-coded data using previously held data.

14 Claims, 3 Drawing Sheets

(56) References Cited

U.S. PATENT DOCUMENTS

| | | | |
|---|---|---|---|
| 2003/0046426 A1* | 3/2003 | Nguyen | H04L 41/0681 709/242 |
| 2015/0229726 A1* | 8/2015 | Jimenez | H04W 4/005 709/227 |
| 2017/0048783 A1* | 2/2017 | Savolainen | H04W 40/24 |

* cited by examiner

METHOD FOR PROPAGATING NETWORK MANAGEMENT DATA FOR ENERGY-EFFICIENT IOT NETWORK MANAGEMENT AND ENERGY-EFFICIENT IOT NODE APPARATUS

BACKGROUND

1. Technical Field

The present invention relates generally to the Internet of Things (IoT) and, more particularly, to technology for the network management of the IoT.

2. Description of the Related Art

Research on IoT started from a concept of assigning information processing function, data transmission and reception functions to things and connecting the things to a public network, such as the Internet, and has explosively proliferated through fusion with other concepts, such as a mobile network, smart phones, ubiquitous network, sensor network, big data technology, etc.

Although a situation varies depending on the intrinsic function and shape of a thing, a device having a network function (hereinafter referred to as a "network function device") may be supposedly a device that operates based on a battery in order to attach such a network function device to a thing which is mobile, portable, or non-grid, while maintaining the function and shape of the thing.

Since the capabilities of the IoT increase in proportion to the number of things it is connected with, the energy efficiency of network function devices attached to respective things is a matter of great concern.

In general, the energy efficiency of a network function device, i.e., a node, attached to a thing is dependent on the power consumption during transmission and reception operations, rather than the power consumption during information collection operations and command processing operations. Although the dissipated power of transmission and reception operations are determined by various factors, such as transmission distance, bit error rate (BER), transmission protocols, etc., a factor that greatly influences the energy over a long period of time is also the number of transmissions.

Since a sub-node, a node among IoT nodes consisting a sub-network, which functions as a gateway to an upper layer, must transmit data collected from other sub-nodes to the upper layer, and transmit network management information and commands received from the upper layer to other sub-nodes, the sub-node should perform transmission operations much more than other sub-nodes do. As a result, the energy of the battery of the specific sub-node functioning as a gateway will be consumed earlier, and therefore the sub-network will not function normally. This phenomenon is called as energy hole problem.

In particular, network management information, such as firmware update, security data, network configuration information, etc., which must be transmitted to all sub-nodes from upper layer may rapidly consume the battery of a specific sub-node that functions as a gateway.

Therefore, there is a need for a method for propagating network management information to sub-nodes that constitute the IoT in an energy-efficient manner.

SUMMARY

The present invention is directed to providing a method for propagating network management data for energy-efficient IoT network management and an energy-efficient IoT node device.

At least some embodiments of the present invention are directed to the provision of a method for propagating network management data for energy-efficient IoT network management and an energy-efficient IoT node device, which are capable of preventing a transmission operation from concentrating at a specific node device functioning as a gateway, thereby minimizing the energy hole problem in which the energy of a specific node device is exhausted early.

At least some embodiments of the present invention are directed to the provision of a method for propagating network management data for energy-efficient IoT network management and an energy-efficient IoT node device, which are capable of reducing the number of transmissions of which a specific node device functioning as a gateway takes charge in order to complete the propagation of network management information.

At least some embodiments of the present invention are directed to the provision of a method for propagating network management data for energy-efficient IoT network management and an energy-efficient IoT node device, which are capable of reducing the total number of transmissions occurring between node devices in order to complete the propagation of network management information.

At least some embodiments of the present invention are directed to the provision of a method for propagating network management data for energy-efficient IoT network management and an energy-efficient IoT node device, which are capable of reducing the total time it takes to complete the propagation of network management information.

In accordance with an aspect of the present invention, there is provided a method for propagating network management data for the energy-efficient management of an Internet of Things (IoT) network including a main node and a plurality of sub-nodes, the method including the steps of: (a) dividing, by the main node, the plurality of sub-nodes into at least two terminal sub-nodes and the remaining intermediate sub-nodes, and determining, by the main node, a transmission path so that the at least two terminal sub-nodes locate at end points, respectively, and the terminal sub-nodes and the intermediate sub-nodes satisfy an acyclic graph condition; (b) dividing, by the main node, the plurality of pieces of data of network management information into at least two data groups, and transmitting, by the main node, one of the at least two data groups to one of the terminal sub-nodes, respectively; (c) transmitting, by each of the terminal sub-nodes, the data of the received data group to adjacent intermediate sub-nodes on the transmission path on a per-unit basis; (d) performing, by each of the intermediate sub-nodes, network coding on two pieces of data selected for appropriateness for network coding transmission for at least two adjacent intermediate sub-nodes or for at least one adjacent intermediate sub-node and one of the terminal sub-nodes, and transmitting, by the intermediate sub-node, the network-coded data to the at least two intermediate adjacent sub-nodes or to the at least one adjacent intermediate sub-node and the terminal sub-node; and (e) decoding, by the intermediate sub-node, the received network-coded data using previously held data.

At step (a), the terminal sub-nodes may be two in number, and the acyclic graph condition may be a condition in which all sub-nodes are present on a single linear graph.

Step (d) may include the step of selecting, by the intermediate sub-node, among data which are held by the intermediate sub-node, data which are present only at any one of the at least two adjacent sub-nodes, as the at least two pieces of data appropriate for network coding transmission.

The at least two pieces of data appropriate for network coding transmission may be selected for two intermediate sub-nodes $s_{n-1}$ and $s_{n+1}$ adjacent to an intermediate sub-node $s_n$ according to the following equation:

$$d_i \in \hat{N}_n \cap \hat{N}_{n+1}$$

$$d_j \in \hat{N}_n \cap \hat{N}_{n-1}$$

where $d_i$ is data common to a to-be-transmitted data group $\hat{N}_n$ of the intermediate sub-node $s_n$ and a to-be-transmitted data group $\hat{N}_{n+1}$ of the intermediate sub-node $s_{n+1}$, and $d_j$ is data common to the to-be-transmitted data group $\hat{N}_n$ of the intermediate sub-node $s_n$ and a to-be-transmitted data group $\hat{N}_{n-1}$ of the intermediate sub-node $s_{n-1}$; and the to-be-transmitted data group $\hat{N}_n$ may be defined by the following equations:

$$\hat{N}_n = N_n - Y_n$$

$$Y_n = (N_{n-1} \cap N_n \cap N_{n+1})$$

where $N_{n-1}$, $N_n$ and $N_{n+1}$ are each a data group that includes pieces of data that are held by each of the intermediate sub-nodes $s_{n-1}$, $s_n$ and $s_{n+1}$.

The at least two pieces of data appropriate for network coding transmission may be selected for two intermediate sub-nodes $s_{n-1}$ and $s_{n+1}$ adjacent to an intermediate sub-node $s_n$ according to the following equation:

$$d_i \in \hat{N}_n \cap N_{n+1}$$

$$d_j \in \hat{N}_n \cap N_{n-1}$$

where $d_i$ is data common to a to-be-transmitted data group $\hat{N}_n$ of the intermediate sub-node $s_n$ and a to-be-transmitted data group $N_{n+1}$ of the intermediate sub-node $s_{n+1}$, and $d_j$ is data common to the to-be-transmitted data group $\hat{N}_n$ of the intermediate sub-node $s_n$ and a to-be-transmitted data group $N_{n-1}$ of the intermediate sub-node $s_{n-1}$; and the to-be-transmitted data group $\hat{N}_n$ may be defined by the following equations:

$$\hat{N}_n = N_n - Y_n$$

$$Y_n = (N_{n-1} \cap N_n \cap N_{n+1})$$

where $N_{n-1}$, $N_n$ and $N_{n+1}$ are each a data group that includes pieces of data that are held by each of the intermediate sub-nodes $s_{n-1}$, $s_n$ and $s_{n+1}$.

Step (d) may include the steps of:

performing, by the intermediate sub-node, network coding on the selected two pieces of data $d_i$ and $d_j$ according to the following equation:

$$\hat{d} = d_i \oplus d_j; \text{ and}$$

transmitting, by the intermediate sub-node, the network-coded data $\hat{d}$ to at least two adjacent intermediate sub-nodes or to an adjacent intermediate sub-node and an adjacent terminal sub-node.

Step (e) may include the steps of:

obtaining, by the intermediate sub-node $s_{n-1}$ having received the network-coded data $\hat{d}$ from the intermediate sub-node $s_n$, data $d_i$ based data $d_j$ being held according to the following equation:

$$d_i = \hat{d} \oplus d_j, \text{ where } d_j \in N_{n-1}; \text{ and}$$

obtaining, by the intermediate sub-node $s_{n+1}$ having received the network-coded data $\hat{d}$ from the intermediate sub-node $s_n$, data $d_j$ based on the data $d_i$ being held according to the following equation:

$$d_j = \hat{d} \oplus d_i, \text{ where } d_i \in N_{n+1}.$$

The method may further include the step of, if the two pieces of data appropriate for network coding transmission have not been selected at step (d), relaying, by the intermediate sub-node, data from its adjacent previous sub-node to its adjacent subsequent sub-node on the transmission path.

In accordance with another aspect of the present invention, there is provided a computer-readable non-transitory storage medium storing a program written to implement a method for propagating network management data according to an embodiment in a computer.

In accordance with still another aspect of the present invention, there is provided an energy-efficient Internet of Things (IoT) node device that functions as any one of a main node and a sub-node and that constitutes part of an energy-efficient IoT network, wherein: if the energy-efficient IoT node device functions as the main node, the energy-efficient IoT node device is operative to: divide the plurality of sub-nodes of the energy-efficient IoT network into at least two terminal sub-nodes and the remaining intermediate sub-nodes, and determine a transmission path so that the at least two terminal sub-nodes locate at end points, respectively, and the terminal sub-nodes and the intermediate sub-nodes satisfy an acyclic graph condition; and divide the plurality of pieces of data of network management information into at least two data groups, and transmit one of the at least two data groups to one of the terminal sub-nodes, respectively.

If the energy-efficient IoT node device functions as the sub-node, the energy-efficient IoT node device may be operative to: transmit the data of the data group, received from the main node, to adjacent intermediate sub-nodes on the transmission path on a per-unit basis; perform network coding on two pieces of data selected for appropriateness for network coding transmission for at least two adjacent intermediate sub-nodes or for at least one adjacent intermediate sub-node and one of the terminal sub-nodes, and transmit the network-coded data to the at least two intermediate adjacent sub-nodes or to the at least one adjacent intermediate sub-node and the terminal sub-node; and decode the received network-coded data using previously held data.

In accordance with still another aspect of the present invention, there is provided an energy-efficient Internet of Things (IoT) network system including a main node and a plurality of sub-nodes; wherein the main node divides the plurality of sub-nodes of the energy-efficient IoT network into at least two terminal sub-nodes and the remaining intermediate sub-nodes, determines a transmission path so that the at least two terminal sub-nodes locate at end points, respectively, and the terminal sub-nodes and the intermediate sub-nodes satisfy an acyclic graph condition, divides the plurality of pieces of data of network management information into at least two data groups, and transmits one of the at least two data groups to one of the terminal sub-nodes, respectively; and wherein each of the plurality of sub-nodes, if the sub-node is classified as a terminal sub-node, transmits the data of the data group, received from the main node, to adjacent intermediate sub-nodes on the transmission path on a per-unit basis, and, if the sub-node is classified as an intermediate sub-node, performs network coding on two pieces of data selected for appropriateness for network coding transmission for at least two adjacent intermediate sub-nodes or for at least one adjacent intermediate sub-node and one of the terminal sub-nodes, transmits the network-coded data to the at least two intermediate adjacent sub-nodes or to the at least one adjacent intermediate sub-node and the terminal sub-node, and decodes the received network-coded data using previously held data.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

This work was supported by the National Research Foundation of KOREA (NRF) and Center for Women In Science, Engineering and Technology (WISET).

With regard to embodiments of the present invention disclosed herein, specific structural and functional descriptions are given merely for the purpose of illustrating the embodiments of the present invention.

Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and redundant descriptions of the same components will be omitted.

Throughout the specification, IoT node devices and main node devices may be referred to as sub-nodes and a main node unless they are used in a clearly different technical context.

Figure 1:
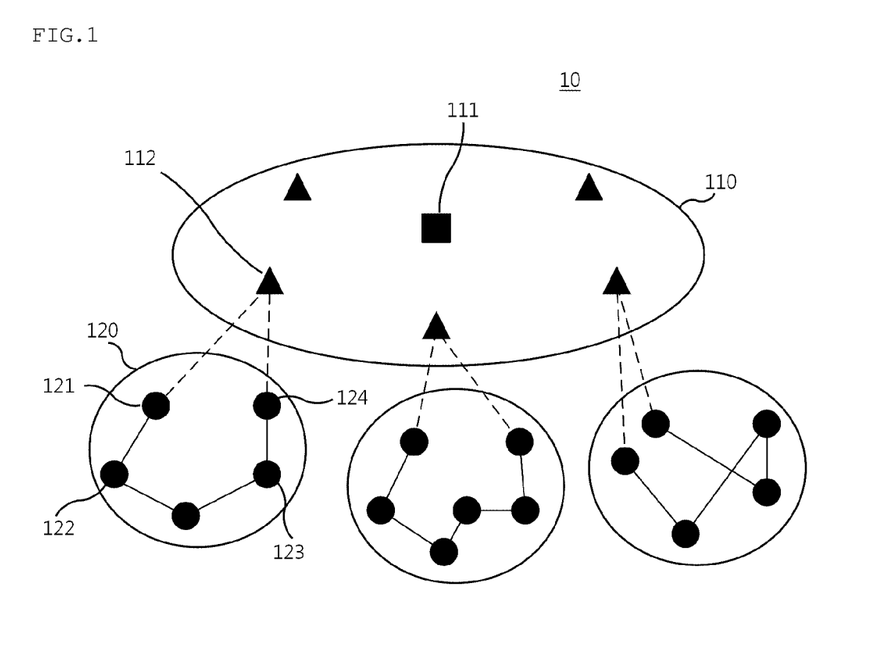
FIG. 1 is a conceptual diagram showing the hierarchical network structure of an IoT network for a method for propagating network management data for energy-efficient IoT network management according to an embodiment of the present invention.

FIG. 1 is a conceptual diagram showing the hierarchical network structure of an IoT network for a method for propagating network management data for energy-efficient IoT network management according to an embodiment of the present invention.

Referring to FIG. 1, the hierarchical network structure 10 of the IoT is hierarchically configured to include an upper layer network 110 and at least one lower layer network 120.

The upper layer network 110 is a network connected to the external Internet or an external IoT platform server via a backbone. The upper layer network 110 may include a central hub 111 connected to the outside via the backbone, and main node devices 112 (or a main node), selected (voted) from IoT sub-node devices 121, 122, 123 and 124 (or sub-nodes) to function as a gateway, or previously set as a main device.

The lower layer network 120 may include the IoT node devices 121, 122, 123 and 124 attached to things, respectively, and configured to collect information about the things and exchange data with the upper layer network 110.

In an embodiment, the main node 112 of the upper layer network 110 has the substantially identical hardware and principal functions as the sub-nodes 121, 122, 123 and 124, but may be selected to function as a gateway between the upper layer network 110 and the lower layer network 120 or may be manually designated.

In another embodiment, the main node 112 of the upper layer network 110 may be based on powerful hardware than the sub-nodes 121, 122, 123 and 124 to further function as a gateway, or may be specialized for gateway functionality.

The central hub 111, the main node 112 and the sub-nodes 121, 122, 123 and 124 may constitute an IoT network system.

Meanwhile, it is preferred that in a method for propagating network management data for energy-efficient IoT network management according to the present invention, the sub-nodes 121, 122, 123 and 124 of the lower layer network 120 can form a transmission path, satisfying an acyclic graph condition in which there exist no internal cycle, at least during the propagation of network management information. For example, the sub-nodes 121, 122, 123 and 124 may form a transmission path that can be arranged as a string. However, this condition is not required for transmission and reception of information other than the network management information of the present invention.

The main node 112 may divide the data of the network management information into a plurality of data groups, for example, two data groups, and may transmit one of the plurality of data groups, for example, one of the two data groups, to one of a plurality of sub-nodes, for example, one of two sub-nodes 121 and 124, respectively, corresponding to the end points of the transmission path formed by the sub-nodes 121, 122, 123 and 124 of the lower layer network 120. Thereafter, the sub-nodes 121 and 124 corresponding to the end points transmit the data of their received data groups to the sub-nodes 122 and 123 adjacent over the transmission path, using a network coding technique. In the same manner, the sub-nodes 122 or 123 also transmit their received data to other sub-nodes adjacent over the transmission path using the network coding technique.

Figure 2:
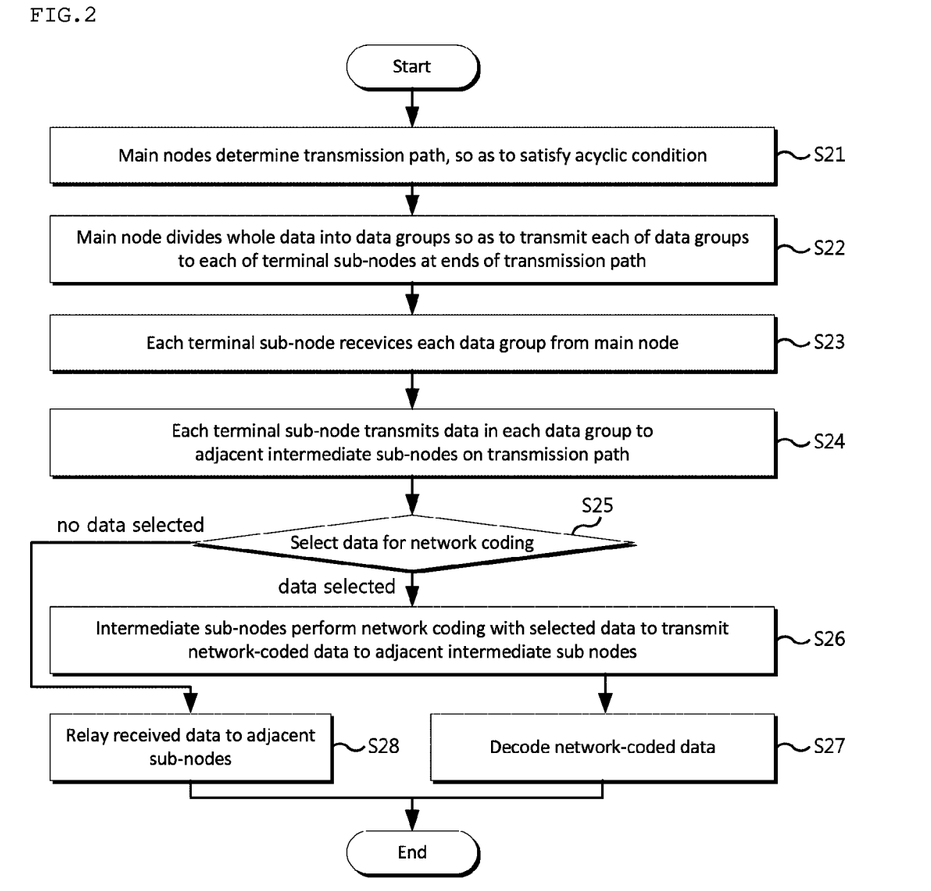
FIG. 2 is a flowchart illustrating a method for propagating network management data for energy-efficient IoT network management according to an embodiment of the present invention.
Figure 3:
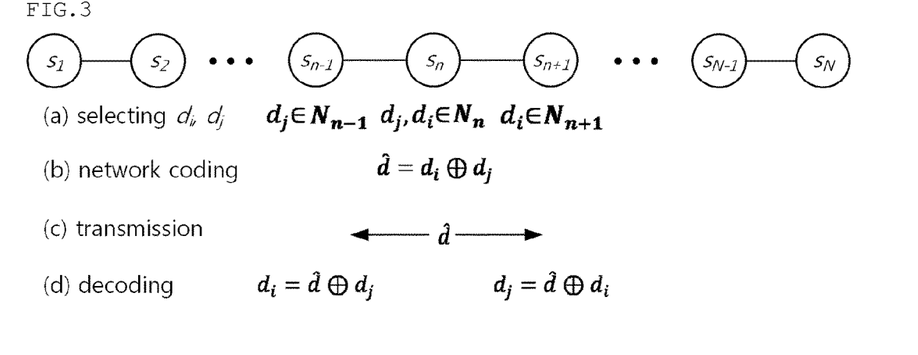
FIG. 3 is a diagram illustrating the data transmission operation of sub-nodes based on network coding in a method for propagating network management data for energy-efficient IoT network management according to an embodiment of the present invention.

Referring to FIGS. 2 and 3 in order to describe the method for propagating network management data for energy-efficient IoT network management according to the present invention in greater detail, FIG. 2 is a flowchart illustrating a method for propagating network management data for energy-efficient IoT network management according to an embodiment of the present invention, and FIG. 3 is a diagram illustrating the data transmission operation of sub-nodes based on network coding in a method for propagating network management data for energy-efficient IoT network management according to an embodiment of the present invention.

The method for propagating network management data for energy-efficient IoT network management according to the embodiment of the present invention illustrated in FIG. 2 is performed on a transmission path, such as that illustrated in FIG. 3.

As illustrated in FIG. 3, N sub-nodes $s_1, s_2, \ldots, s_{n-1}, s_n, s_{n+1}, \ldots, s_{N-1}, s_N$ may form a transmission path that satisfies an acyclic graph condition without internal cycle, for example, a transmission path that is arranged as a string, in order to propagate at least network management information.

Although each of the sub-nodes $s_1$ and $s_N$ present at two end points of the transmission path is connected to a single adjacent sub-node $s_2$ or $s_{N-1}$, respectively, n-th sub-nodes $s_n$, other than the sub-nodes $s_1$ and $s_N$ at end points, transmit and receive data to and from two adjacent sub-nodes $s_{n-1}$ and $s_{n+1}$ using a network coding technique.

In this context, a method for propagating network management data for energy-efficient IoT network management according to an embodiment of the present invention may start from step S21.

At step S21, the main node 112 may classify the N sub-nodes $s_1, s_2, \ldots, s_{n-1}, s_n, s_{n+1}, \ldots, s_{N-1}, s_N$ into at least two terminal sub-nodes $s_1$ and $s_N$ and the remaining intermediate sub-nodes $s_2, \ldots, s_{n-1}, s_n, s_{n+1}, \ldots,$ and $s_{N-1}$, and determines a transmission path such that the at least two terminal sub-nodes $s_1$ and $s_N$ place at respective end points of the transmission path and all of the terminal sub-nodes $s_1$ and $s_N$ and the intermediate sub-nodes $s_2, \ldots, s_{n-1}, s_n, s_{n+1}, \ldots,$ and $s_{N-1}$ satisfy an acyclic graph condition.

In this case, the main node 112 may be one of the sub-nodes and be selected as a gateway from the sub-nodes, or may be a node specialized for a main node different from the sub-nodes.

At step S22, the main node 112 divides a plurality of pieces of data, constituting network management information, into at least two data groups, and transmits each of the plurality of data groups $N_1$ and $N_N$ to each of the terminal sub-nodes $s_1$ and $s_N$ present at a plurality of end points on the transmission path.

More specifically, the main node 112 divides L pieces of data $d_1, d_2, \ldots, d_L$, constituting network management information, received from the central hub 111 into two data groups $N_1 = \{d_1, \ldots, d_{[L/2]}\}$ and $N_N = \{d_{[L/2]+1}, \ldots, d_L\}$, and transmits the data groups $N_1$ and $N_N$ to the terminal sub-nodes $s_1$ and $s_N$, respectively.

At step S23, each of the terminal sub-nodes $s_1$ and $s_N$ at a plurality of end points on the transmission path receives one of the plurality of data groups $N_1$ and $N_N$ from the main node 112.

At step S24, the terminal sub-node $s_1$ or $s_N$ transmits data of the received data group $N_1$ or $N_N$ piece by piece to an adjacent intermediate sub-node $s_2, \ldots, s_{n-1}, s_n, s_{n+1}, \ldots,$ or $s_{N-1}$ on the transmission path.

At step S25, an intermediate sub-node $s_2, \ldots, s_{n-1}, s_n, s_{n+1}, \ldots,$ or $s_{N-1}$ selects two pieces of data $d_i$ and $d_j$ appropriate for network coding transmission to at least two adjacent sub-nodes of the intermediate sub-nodes $s_2, \ldots, s_{n-1}, s_n, s_{n+1}, \ldots,$ and $s_{N-1}$ or to at least one intermediate sub-node $s_3$ or $s_{N-2}$ and the terminal sub-node $s_1$ or $s_N$.

If the two pieces of data $d_i$ and $d_j$ have been selected, the process proceeds to step S26. If there is no appropriate data, the process proceeds to step S28 of performing transmission without network coding. For example, in the early stage of the propagation of network management data, each of the intermediate sub-nodes may have only a few pieces of data, not enough for network coding. In this case, a sub-node on the transmission path may relay data to another adjacent sub-node without network coding using a common method.

More specifically, at step S25, each of the intermediate sub-nodes $s_2, \ldots, s_{n-1}, s_n, s_{n+1}, \ldots,$ and $s_{N-1}$ may select the two pieces of data $d_i$ and $d_j$, appropriate for network coding transmission, among data received by the corresponding intermediate sub-node, such that each piece of data $d_i$ and $d_j$ is present only at any one of at least two adjacent sub-nodes, not both of the adjacent sub-nodes.

Referring additionally to FIG. 3, an intermediate sub-node $s_n$ neighbors two intermediate sub-nodes $s_{n-1}$ and $s_{n+1}$ on the transmission path, and the sub-nodes $s_{-1}$, $s_n$ and $s_{n+1}$ currently hold data groups $N_{n-1}$, $N_n$ and $N_{n+1}$.

In this case, as shown in the following Equation 1, the three sub-nodes $s_{n-1}$, $s_n$ and $s_{n+1}$ do not need to transmit the data group $Y_n$ of data common to the data groups $N_{n-1}$, $N_n$ and $N_{n+1}$:

$$Y_n = (N_{n-1} \cap N_n \cap N_{n+1}) \quad (1)$$

Accordingly, data, which is appropriate for the network coding by the intermediate sub-node $s_n$ to transmit to adjacent sub-nodes $s_{n-1}$ and $s_{n+1}$, is data from the data group $N_n$ of the data held by the intermediate sub-node $s_n$, exclusive of the data group $Y_n$.

In this case, it should be noted that to determine the data group $Y_n$ that the intermediate sub-node $s_n$ does not need to transmit, the adjacent intermediate sub-nodes $s_{n-1}$, $s_n$ and $s_{n+1}$ do not need to notify one another beforehand the data held by themselves.

Data $d_j$ and $d_k$ belonging to the data group $N_1$ are sequentially transmitted from the terminal sub-node $s_1$ to the right, and data $d_i$ belonging to the data group $N_n$ is sequentially transmitted from the terminal sub-node $s_N$ to the left. Assume that an intermediate sub-node $s_n$ holds data $d_i$, $d_j$ and $d_k$ at a specific time. The intermediate sub-nod $s_n$ has not yet transmitted the data $d_i$, which is received from the intermediate sub-node $s_{n+1}$, to the intermediate sub-node $s_{n-1}$ yet, and has not yet transmitted the data $d_j$, which is received from the intermediate sub-node $s_{n-1}$, to the intermediate sub-node $s_{n+1}$ yet. If the intermediate sub-node $s_n$ has transmitted the data $d_k$, which is received from the intermediate sub-node $s_{n-1}$, to the intermediate sub-node $s_{n+1}$ already, it may be logically determined that the data held in common by the three intermediate sub-nodes $s_{n-1}$, $s_n$ and $s_{n+1}$ is only data $d_k$.

Accordingly, a to-be-transmitted data group $\hat{N}_n$ may be constructed, as shown in the following Equation 2:

$$\hat{N} = N_n - Y_n \quad (2)$$

The intermediate sub-node $s_n$ may select at least two pieces of data, which are data present at the intermediate sub-node $s_n$, and which are only present at any one of at least two adjacent sub-nodes $s_{n-1}$ and $s_{n+1}$ and are not present at the other sub-node $s_{n+1}$ or $s_{n-1}$, from the data of the to-be-transmitted data group $\hat{N}_n$, as data $d_i$ and $d_j$ appropriate for network coding transmission.

More specifically, the intermediate sub-node $s_n$ may select the two pieces of data $d_i$ and $d_j$ appropriate for network coding transmission according to Equation 3:

$$d_i \in \hat{N}_n \cap \hat{N}_{n+1}$$

$$d_j \in \hat{N}_n \cap \hat{N}_{n-1} \quad (3)$$

According to Equation 3, selected are the data $d_i$ common to the to-be-transmitted data group $\hat{N}_n$ of the n-th intermediate sub-node $s_n$ and the to-be-transmitted data group $\hat{N}_{n+1}$ of the (n+1)-th intermediate sub-node $s_{n+1}$, and the data $d_j$ common to the to-be-transmitted data group $\hat{N}_n$ of the n-th intermediate sub-node $s_n$ and the to-be-transmitted data group $\hat{N}_{n-1}$ of the (n-1)-th intermediate sub-node $s_{n-1}$. The data $d_i$ is not present at the (n-1)-th intermediate sub-node $s_{n-1}$ but is present both at the n-th intermediate sub-node $s_n$ and the (n+1)-th intermediate sub-node $s_{n+1}$. In contrast, the data $d_j$ is not present at the (n+1)-th intermediate sub-node $s_{n+1}$, but is present both at the n-th intermediate sub-node $s_n$ and the (n-1)-th intermediate sub-node $s_{n-1}$.

As for such an embodiment in which the intermediate sub-node $s_n$ takes into account not only its own not-requiring-transmission data group $Y_n$ but also the not-requiring-transmission data groups $Y_{n+1}$ and $Y_{n-1}$ of the adjacent intermediate sub-nodes $s_{n+1}$ and $s_{n-1}$, the n-th intermediate sub-node $s_n$ must further take into account the to-be-transmitted data group $\hat{N}_{n+1}$ and the to-be-transmitted data group $\hat{N}_{n-1}$ of the respective adjacent sub-nodes $s_{n+1}$ and $s_{n-1}$ in order to select the two pieces of data $d_i$ and $d_j$ appropriate for network coding transmission according to Equation 3.

For example, since, in order to take into account the to-be-transmitted data group $\hat{N}_{n+1}$ of the intermediate sub-node $s_{n+1}$, the intermediate sub-node $s_n$ must take into account the data groups $N_1$ and $N_{n+1}$ of the intermediate sub-nodes $s_n$ and $s_{n+2}$ adjacent to the intermediate sub-node $s_{n+1}$ according to Equations 1 and 2, an additional computational or transmission load may be required.

In contrast, in another embodiment, the intermediate sub-node $s_n$ may take into account only its own not-requiring-transmission data group $Y_n$.

More specifically, the intermediate sub-node $s_n$ may select the two pieces of data $d_i$ and $d_j$ appropriate for network coding transmission according to Equation 4:

$$d_i \in \hat{N}_n \cap N_{n+1}$$

$$d_j \in \hat{N}_n \cap N_{n-1} \quad (4)$$

According to Equation 4, selected are the data $d_i$ common to the to-be-transmitted data group $\hat{N}_n$ of the n-th intermediate sub-node $s_n$ and the to-be-transmitted data group $N_{n+1}$ of the (n+1)-th intermediate sub-node $s_{n+1}$, and the data $d_j$ common to the to-be-transmitted data group $\hat{N}_n$ of the n-th intermediate sub-node $s_n$ and the to-be-transmitted data group $N_{n-1}$ of the (n−1)-th intermediate sub-node $s_{n-1}$. The data $d_i$ is not present at the (n−1)-th intermediate sub-node $s_{n-1}$ but is present both at the n-th intermediate sub-node $s_n$ and the (n+1)-th intermediate sub-node $s_{n+1}$. In contrast, the data $d_j$ is not present at the (n+1)-th intermediate sub-node $s_{n+1}$, but is present both at the n-th intermediate sub-node $s_n$ and the (n−1)-th intermediate sub-node $s_{n-1}$.

In this embodiment, the intermediate sub-node $s_n$ takes into account only its own not-requiring-transmission data group $Y_n$, but does not take into account the not-requiring-transmission data groups $Y_{n+1}$ and $Y_{n-1}$ of the adjacent intermediate sub-nodes $s_{n+1}$ and $s_{n-1}$.

At step S26, the intermediate sub-nodes $s_2, \ldots, s_{n-1}, s_n, s_{n+1}, \ldots$, and $s_{N-1}$ perform network coding on the selected two pieces of data $d_i$ and $d_j$, and transmits the network-coded data to at least two adjacent intermediate sub-nodes $s_2, \ldots, s_{n-1}, s_n, s_{n+1}, \ldots$, and $s_{N-1}$ or to the adjacent intermediate sub-node $s_3$ or $s_{N-2}$ and the adjacent terminal sub-node $s_1$ or $s_N$.

More specifically, the intermediate sub-nodes $s_2, \ldots, s_{n-1}, s_n, s_{n+1}, \ldots$, and $s_{N-1}$ perform network coding on the selected two pieces of data $d_i$ and $d_j$ according to Equation 5:

$$\hat{d} = d_i \oplus d_j \quad (5)$$

The network-coded data $\hat{d}$ is transmitted from the intermediate sub-node $s_N$ to the two adjacent intermediate sub-nodes $s_{n+1}$ and $s_{n-1}$.

In this case, the operator "⊕" refers to an addition operation defined in the Galois Field (GF).

At step S27, the intermediate sub-node $s_2, \ldots, s_{n-1}, s_n, s_{n+1}, \ldots$, or $s_{N-1}$ receives the network-coded data $\hat{d}$, and decodes the received network-coded data $\hat{d}$ using previously held data $d_i$ or $d_j$.

In the example of FIG. 3, the (n−1)-th intermediate sub-node $s_{n-1}$ receives the network-coded data $\hat{d}$ from the intermediate sub-node $s_n$ then and obtains data $d_i$ based on the data $d_j$ being held, as shown in Equation 6:

$$d_i = \hat{d} \oplus d_j, \text{ where } d_j \in N_{n-1} \quad (6)$$

The decoded data $d_i$ becomes a new element of the data group $N_{n-1}$ obtained by the (n−1)-th intermediate sub-node $s_{n-1}$.

In the same manner, the (n+1)-th intermediate sub-node $s_{n+1}$ receives the network-coded data $\hat{d}$ from the intermediate sub-node $s_n$ and obtains data $d_j$ based on the data $d_i$ being held, as shown in Equation 7:

$$d_j = \hat{d} \oplus d_i, \text{ where } d_i \in N_{n+1} \quad (7)$$

The decoded data $d_j$ becomes a new element of the data group $N_{n+1}$ obtained by the (n+1)-th intermediate sub-node $s_{n+1}$.

If the data $d_i$ and $d_j$ appropriate for network coding transmission have not been selected at step S25, the intermediate sub-node $s_2, \ldots, s_{n-1}, s_n, s_{n+1}, \ldots$, or $s_{N-1}$ may relay data from its adjacent antecedent sub-node to its adjacent subsequent sub-node on the transmission path at step S28.

Figure 4:
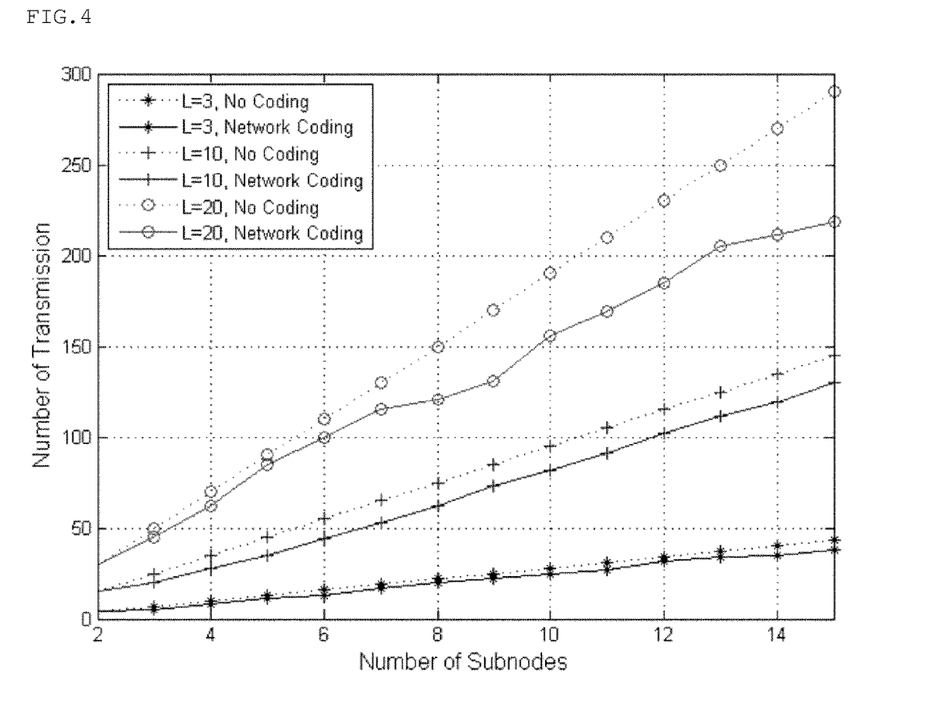
FIG. 4 is a graph showing the comparison between the number of transmissions based on a method for propagating network management data for energy-efficient IoT network management according to an embodiment of the present invention and the number of transmissions based on a common transmission method.

FIG. 4 is a graph showing the comparison between the number of transmissions based on a method for propagating network management data for energy-efficient IoT network management according to an embodiment of the present invention and the number of transmissions based on a common transmission method.

Referring to FIG. 4, when the number of sub-nodes is N and the size of network management data (for example, the number of packets) is L, the number of transmissions required when individual sub-nodes, along a transmission path satisfying an acyclic graph condition, simply perform relay (indicated by "no coding") is compared with the number of transmissions required when individual sub-nodes perform transmission using network coding via a transmission path by means of a method for propagating network management data for energy-efficient IoT network management according to the present invention (indicated by "network coding").

When the number of packets increases (L=3), the difference in the number of transmissions between two methods is not significant.

When the number of packets further increases (L=10), the number of transmissions in the method for propagating network management data using network coding according to the present invention is reduced by about 10 to 15% points compared to the simple relay method.

When the number of packets further increases (L=20), the number of transmissions in the method for propagating network management data using network coding according to the present invention is reduced by about 20 to 30% points compared to the simple relay method.

When the firmware of a sensor node device constituting part of a sensor network or security data has a size of a few MB, the number of packets may range from a few hundreds to a few thousands if it is assumed that the size of each packet is 8 kb. Accordingly, it may be expected that the method for propagating network management data using network coding according to the present invention can significantly reduce the number of transmissions compared to the simple relay method.

A method for propagating network management data for energy-efficient IoT network management and an energy-efficient IoT node device according to at least some embodiments of the present invention are capable of preventing transmission operations from concentrating at a specific node device functioning as a gateway, thereby minimizing chance of energy hole problem in which the energy of a specific node device is to be exhausted earlier.

A method for propagating network management data for energy-efficient IoT network management and an energy-efficient IoT node device according to at least some embodiments of the present invention are capable of reducing the number of transmissions that a specific node device functioning as a gateway carries out in order to complete the propagation of network management information.

A method for propagating network management data for energy-efficient IoT network management and an energy-efficient IoT node device according to at least some embodiments of the present invention are capable of reducing the total number of transmissions occurring between nodes in order to complete the propagation of network management information.

A method for propagating network management data for energy-efficient IoT network management and an energy-efficient IoT node device according to at least some embodiments of the present invention are capable of reducing the total time to complete the propagation of network management information.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to at least one embodiment of the present invention may be implemented as a computer-readable code on a computer-readable storage medium. The computer-readable storage medium includes all types of storage devices on which data that can be read by a computer system is stored. Examples of the computer-readable storage medium include read-only memory (ROM), random access memory (RAM), an optical disk, a magnetic tape, a floppy disk, nonvolatile memory, etc. Furthermore, the computer-readable storage medium may be distributed across computer systems connected to each other over a network, and computer-read able code may be stored and executed in the computer systems in a distributed manner.

What is claimed is:

1. A method for propagating network management data for energy-efficient management of an Internet of Things (IoT) network including a main node and a plurality of sub-nodes, the method comprising the steps of:
   (a) dividing, by the main node, the plurality of sub-nodes into at least two terminal sub-nodes and remaining intermediate sub-nodes, and determining, by the main node, a transmission path so that the at least two terminal sub-nodes locate at end points, respectively, and the terminal sub-nodes and the intermediate sub-nodes satisfy an acyclic graph condition;
   (b) dividing, by the main node, a plurality of pieces of data of network management information into at least two data groups, and transmitting, by the main node, one of the at least two data groups to one of the terminal sub-nodes, respectively;
   (c) transmitting, by each of the terminal sub-nodes, data of the received data group to adjacent intermediate sub-nodes on the transmission path on a per-unit basis;
   (d) performing, by each of the intermediate sub-nodes, network coding on at least two pieces of data selected for network coding transmission for at least two adjacent intermediate sub-nodes or for at least one adjacent intermediate sub-node and one of the terminal sub-nodes, and transmitting, by the intermediate sub-node, the network-coded data to the at least two intermediate adjacent sub-nodes or to the at least one adjacent intermediate sub-node and the terminal sub-node; and
   (e) decoding, by the intermediate sub-node, the received network-coded data using previously held data,
   wherein step (d) comprises the step of selecting, by the intermediate sub-node, among data which are held by the intermediate sub-node, data which are present only at any one of the at least two adjacent sub-nodes, as the at least two pieces of data for network coding transmission, and
   wherein:
   the at least two pieces of data for network coding transmission are selected for two intermediate sub-nodes $s_{n-1}$ and $s_{n+1}$ adjacent to an intermediate sub-node $s_n$ according to the following equation:

$$d_i \in \hat{N}_n \cap \hat{N}_{n+1}$$

$$d_j \in \hat{N}_n \cap \hat{N}_{n-1}$$

where $d_i$ is data common to a to-be-transmitted data group $\hat{N}_n$ of the intermediate sub-node $s_n$ and a to-be-transmitted data group $\hat{N}_{n+1}$ of the intermediate sub-node $s_{n+1}$, and $d_j$ is data common to the to-be-transmitted data group $\hat{N}_n$ of the intermediate sub-node $s_n$ and a to-be-transmitted data group $\hat{N}_{n-1}$ of the intermediate sub-node $s_{n-1}$; and
   the to-be-transmitted data group $\hat{N}_n$ is defined by the following equations:

$$\hat{N}_n = N_n - Y_n$$

$$Y_n = (N_{n-1} \cap N_n \cap N_{n+1})$$

where $N_{n-1}$, $N_n$ and $N_{n+1}$ are respectively a data group that includes pieces of data that are held by each of the intermediate sub-nodes $s_{n-1}$, $s_n$ and $s_{n+1}$.

2. The method of claim 1, wherein at step (a), number of the terminal sub-nodes is two, and the acyclic graph condition is a condition in which all sub-nodes are present on a single linear graph.

3. The method of claim 1, further comprising the step of, if the at least two pieces of data for network coding transmission have not been selected at step (d), relaying, by the intermediate sub-node, data from its adjacent previous sub-node to its adjacent subsequent sub-node on the transmission path.

4. A computer-readable non-transitory storage medium storing a program written to implement the method for propagating network management data set forth in claim 1.

5. A method for propagating network management data for energy-efficient management of an Internet of Things (IoT) network including a main node and a plurality of sub-nodes, the method comprising the steps of:
   (a) dividing, by the main node, the plurality of sub-nodes into at least two terminal sub-nodes and remaining intermediate sub-nodes, and determining, by the main node, a transmission path so that the at least two terminal sub-nodes locate at end points, respectively, and the terminal sub-nodes and the intermediate sub-nodes satisfy an acyclic graph condition;
   (b) dividing, by the main node, a plurality of pieces of data of network management information into at least two data groups, and transmitting, by the main node, one of the at least two data groups to one of the terminal sub-nodes, respectively;

(c) transmitting, by each of the terminal sub-nodes, data of the received data group to adjacent intermediate sub-nodes on the transmission path on a per-unit basis;

(d) performing, by each of the intermediate sub-nodes, network coding on at least two pieces of data selected for network coding transmission for at least two adjacent intermediate sub-nodes or for at least one adjacent intermediate sub-node and one of the terminal sub-nodes, and transmitting, by the intermediate sub-node, the network-coded data to the at least two intermediate adjacent sub-nodes or to the at least one adjacent intermediate sub-node and the terminal sub-node; and (e) decoding, by the intermediate sub-node, the received network-coded data using previously held data, wherein step (d) comprises the step of selecting, by the intermediate sub-node, among data which are held by the intermediate sub-node, data which are present only at any one of the at least two adjacent sub-nodes, as the at least two pieces of data for network coding transmission, and wherein:

the at least two pieces of data for network coding transmission are selected for two intermediate sub-nodes $s_{n-1}$ and $s_{n+1}$ adjacent to an intermediate sub-node $s_n$ according to the following equation:

$$d_i \in \hat{N}_n \cap \hat{N}_{n+1}$$

$$d_j \in \hat{N}_n \cap \hat{N}_{n-1}$$

where $d_i$ is data common to a to-be-transmitted data group $\hat{N}_n$ of the intermediate sub-node $s_n$ and a to-be-transmitted data group $N_{n+1}$ of the intermediate sub-node $s_{n+1}$, and $d_j$ is data common to the to-be-transmitted data group $\hat{N}_n$ of the intermediate sub-node $s_n$ and a to-be-transmitted data group $N_{n-1}$ of the intermediate sub-node $s_{n-1}$; and the to-be-transmitted data group $\hat{N}_n$ is defined by the following equations:

$$\hat{N}_n = N_n - Y_n$$

$$Y_n = (N_{n-1} \cap N_n \cap N_{n+1})$$

where $N_{n-1}$, $N_n$ and $N_{n+1}$ are respectively a data group that includes pieces of data that are held by each of the intermediate sub-nodes $s_{n-1}$, $s_n$ and $s_{n+1}$.

6. The method of claim 5, wherein step (d) comprises the steps of:

performing, by the intermediate sub-node, network coding on the selected two pieces of data $d_i$ and $d_j$ according to the following equation:

$$\hat{d} = d_i \oplus d_j; \text{ and}$$

transmitting, by the intermediate sub-node, the network-coded data $\hat{d}$ to at least two adjacent intermediate sub-nodes or to an adjacent intermediate sub-node and an adjacent terminal sub-node.

7. The method of claim 6, wherein step (e) comprises the steps of:

obtaining, by the intermediate sub-node $s_{n-1}$, having received the network-coded data $\hat{d}$ from the intermediate sub-node $s_n$, data $d_i$ based on the data $d_j$ being held according to the following equation:

$$d_i = \hat{d} \oplus d_j, \text{ where } d_j \in N_{n-1}; \text{ and}$$

obtaining, by the intermediate sub-node $s_{n+1}$, having received the network-coded data $\hat{d}$ from the intermediate sub-node $s_n$, data $d_j$ based on the data $d_i$ being held according to the following equation:

$$d_j = \hat{d} \oplus d_i, \text{ where } d_i \in N_{n+1}.$$

8. An energy-efficient Internet of Things (IoT) node device that functions as any one of a main node or a sub-node and that constitutes part of an energy-efficient IoT network, wherein:

if the energy-efficient IoT node device functions as the main node, the energy-efficient IoT node device is operative to:

divide a plurality of sub-nodes of the energy-efficient IoT network into at least two terminal sub-nodes and remaining intermediate sub-nodes, and determine a transmission path so that the at least two terminal sub-nodes locate at end points, respectively, and the terminal sub-nodes and the intermediate sub-nodes satisfy an acyclic graph condition; and divide a plurality of pieces of data of network management information into at least two data groups, and transmit the at least two data groups to the terminal sub-nodes, respectively, wherein the intermediate sub-node is operative to select data, among data which are held by the intermediate sub-node, data which are present only at any one of the at least two adjacent sub-nodes, as the at least two pieces of data for network coding transmission, and wherein the at least two pieces of data for network coding transmission are selected for two intermediate sub-nodes $s_{n-1}$ and $s_{n+1}$ adjacent to an intermediate sub-node $s_n$ according to the following equation:

$$d_i \in \hat{N}_n \cap \hat{N}_{n+1}$$

$$d_j \in \hat{N}_n \cap \hat{N}_{n-1}$$

where $d_i$ is data common to a to-be-transmitted data group $\hat{N}_n$ of the intermediate sub-node $s_n$ and a to-be-transmitted data group $\hat{N}_{n+1}$ of the intermediate sub-node $s_{n+1}$, and $d_j$ is data common to the to-be-transmitted data group $\hat{N}_n$ of the intermediate sub-node $s_n$ and a to-be-transmitted data group $\hat{N}_{n-1}$ of the intermediate sub-node $s_{n-1}$; and the to-be-transmitted data group $\hat{N}_n$ is defined by the following equations:

$$\hat{N}_n = N_n - Y_n$$

$$Y_n = (N_{n-1} \cap N_n \cap N_{n+1})$$

where $N_{n-1}$, $N_n$ and $N_{n+1}$ are each a data group that includes pieces of data that are held by each of the intermediate sub-nodes $s_{n-1}$, $s_n$ and $s_{n+1}$, respectively.

9. The energy-efficient IoT node device of claim 8, wherein:

if the energy-efficient IoT node device functions as the sub-node, the energy-efficient IoT node device is operative to:

transmit data of the data group, received from the main node, to adjacent intermediate sub-nodes on the transmission path on a per-unit basis;

perform network coding on at least two pieces of data selected for network coding transmission with respect to at least two adjacent intermediate sub-nodes or to at least one adjacent intermediate sub-node and one of the terminal sub-nodes, and transmit the network-coded data to the at least two intermediate adjacent sub-nodes or to the at least one adjacent intermediate sub-node and the terminal sub-node; and decode the received network-coded data using previously held data.

10. The energy-efficient IoT node device of claim 8, wherein the terminal sub-nodes are two in number, and the acyclic graph condition is a condition in which all sub-nodes are present on a single linear graph.

11. The energy-efficient IoT node device of claim 8, wherein if the at least two pieces of data for network coding transmission have not been selected, the energy-efficient IoT node device that functions as the sub-node is operative to relay data from its adjacent previous sub-node to its adjacent subsequent sub-node on the transmission path.

12. An energy-efficient Internet of Things (IoT) node device that functions as any one of a main node or a sub-node and that constitutes part of an energy-efficient IoT network, wherein:
if the energy-efficient IoT node device functions as the main node, the energy-efficient IoT node device is operative to:
divide a plurality of sub-nodes of the energy-efficient IoT network into at least two terminal sub-nodes and remaining intermediate sub-nodes, and determine a transmission path so that the at least two terminal sub-nodes locate at end points, respectively, and the terminal sub-nodes and the intermediate sub-nodes satisfy an acyclic graph condition; and
divide a plurality of pieces of data of network management information into at least two data groups, and transmit the at least two data groups to the terminal sub-nodes, respectively,
wherein the intermediate sub-node is operative to select data, among data which are held by the intermediate sub-node, data which are present only at any one of the at least two adjacent sub-nodes, as the at least two pieces of data for network coding transmission, and wherein:
the at least two pieces of data for network coding transmission are selected for two intermediate sub-nodes $s_{n-1}$ and $s_{n+1}$ adjacent to an intermediate sub-node $s_n$ according to the following equation:

$d_i \in \hat{N}_n \cap \hat{N}_{n+1}$ $d_j \in \hat{N}_n \cap \hat{N}_{n-1}$ where $d_i$ is data common to a to-be-transmitted data group $\hat{N}_n$ of the intermediate sub-node $s_n$ and a to-be-transmitted data group $N_{n+1}$ of the intermediate sub-node $s_{n+1}$, and $d_j$ is data common to the to-be-transmitted data group $\hat{N}_n$ of the intermediate sub-node $s_n$ and a to-be-transmitted data group $N_{n-1}$ of the intermediate sub-node $s_{n-1}$; and
the to-be-transmitted data group $\hat{N}_n$ is defined by the following equations:

$\hat{N}_n = N_n - Y_n$ $Y_n = (N_{n-1} \cap N_n \cap N_{n+1})$ where $N_{n-1}$, $N_n$ and $N_{n+1}$ are respectively a data group that includes pieces of data that are held by each of the intermediate sub-nodes $s_{n-1}$, $s_n$ and $s_{n+1}$.

13. The energy-efficient IoT node device of claim 12, wherein the intermediate sub-node is operative to:
perform network coding on the selected two pieces of data $d_i$ and $d_j$ according to the following equation:

$\hat{d} = d_i \oplus d_j$; and transmit the network-coded data $\hat{d}$ to at least two adjacent intermediate sub-nodes or an adjacent intermediate sub-node and an adjacent terminal sub-node.

14. The energy-efficient IoT node device of claim 13, wherein:
the intermediate sub-node $s_{n-1}$ having received the network-coded data $\hat{d}$ from the intermediate sub-node $s_n$ is operative to obtain data $d_i$ based data $d_j$ being held according to the following equation:

$d_i = \hat{d} \oplus d_j$, where $d_j \in N_{n-1}$; and the intermediate sub-node $s_{n+1}$, having received the network-coded data $\hat{d}$ from the intermediate sub-node $s_n$, obtains data $d_j$ based on the data $d_i$ being held according to the following equation:

$d_j = \hat{d} \oplus d_i$, where $d_i \in N_{n+1}$.

* * * * *